United States Patent
Pradhan et al.

(10) Patent No.: US 6,796,506 B1
(45) Date of Patent: Sep. 28, 2004

(54) TRACKING ELECTRONIC DEVICES

(75) Inventors: Salil V. Pradhan, Santa Clara, CA (US); Chandrakant D. Patel, Fremont, CA (US); Geoff M. Lyon, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/383,657

(22) Filed: Mar. 10, 2003

(51) Int. Cl.$^7$ ............................................. G06K 15/00
(52) U.S. Cl. ................................................ 235/462.13
(58) Field of Search .......................... 235/462.13, 385, 235/470, 485, 487, 376, 441, 375, 383, 435; 340/10.1, 568.2, 572.1, 572.4, 572.7, 539.13, 10.3, 505, 5.92

(56) References Cited

U.S. PATENT DOCUMENTS

| | | | |
|---|---|---|---|
| 5,869,820 A | * | 2/1999 | Chen et al. .................. 235/376 |
| 5,963,134 A | * | 10/1999 | Bowers et al. ........... 340/572.1 |
| 5,991,759 A | | 11/1999 | Knoblock et al. |
| 6,127,928 A | | 10/2000 | Issacman et al. |
| 6,204,764 B1 | * | 3/2001 | Maloney .................. 340/568.1 |
| 6,252,508 B1 | * | 6/2001 | Vega et al. ............... 340/572.1 |
| 6,332,098 B2 | * | 12/2001 | Ross et al. .................. 700/226 |
| 6,407,933 B1 | | 6/2002 | Bolognia et al. |
| 6,448,886 B2 | | 9/2002 | Garber et al. |
| 6,462,670 B1 | | 10/2002 | Bolognia et al. |
| 6,473,762 B1 | | 10/2002 | Knoblock et al. |
| 6,570,492 B1 | * | 5/2003 | Peratoner ............... 340/310.01 |
| 6,600,418 B2 | * | 7/2003 | Francis et al. ........... 340/572.1 |
| 6,681,990 B2 | * | 1/2004 | Vogler et al. ................ 235/385 |
| 6,714,121 B1 | * | 3/2004 | Moore ........................ 340/10.3 |
| 2003/0001725 A1 | * | 1/2003 | Moore ........................ 340/10.3 |
| 2003/0174099 A1 | * | 9/2003 | Bauer et al. ................. 343/893 |

* cited by examiner

*Primary Examiner*—Thien M. Le
*Assistant Examiner*—Edwyn Labaze

(57) ABSTRACT

Tracking electronic devices that are equipped with tracking tags and that are stored in designated locations. Reading devices are distributed in locations that are recorded and that correspond to the designated locations of the electronic devices. The reading devices are activated to interrogate the tracking tags. Identification data from the tracking tags is collected to enable determining the presence and location of the electronic devices, based on the recorded location of the reading devices.

23 Claims, 3 Drawing Sheets

TRACKING ELECTRONIC DEVICES

CROSS-REFERENCES

This application is related to the following: co-pending U.S. patent application Ser. No. 10/383,652, filed Mar. 10, 2003 and entitled "Tracking Electronic Devices" by Pradhan et al.; co-pending U.S. patent application Ser. No. 10/354,109, filed Jan. 30, 2003 and entitled "Device Data" by Lyon et al.; and U.S. patent application Ser. No. 10/620,272 filed Jul. 9, 2003 and entitled "Location Aware Sensor Nodes" by Pradhan et al., all of which are assigned to the assignee of the present invention and are incorporated by reference in in their entireties.

FIELD OF THE INVENTION

The invention pertains to tracking electronic devices. More particularly, this invention relates to tracking electronic devices using reading devices and tags.

BACKGROUND OF THE INVENTION

Electronic devices such as computer servers, telecommunications devices, and the like are often housed within cabinets or racks within a building or data center. An example of a rack may be defined as an Electronics Industry Association (EIA) enclosure and typically includes a plurality of open bays. Racks permit the arrangement of electronic devices in a vertical orientation for efficient use of space. The electronic devices are typically installed into respective bays in the rack and include servers, network switches, personal computer boards, and the like, which in turn include a number of electronic components, such as processors, micro-controllers, high speed video cards, memories, semiconductor devices, and the like.

The floor plan of a data center includes the racks generally arranged side-by-side in rows such as in an X-axis and Y-axis array. The locations of the racks within the data center sometimes change as do the locations of the electronic devices within bays of the racks. Moreover, racks and electronic devices are sometimes added, replaced, or removed entirely from a data center. It is desirable to track such equipment changes in a data center and thereby maintain an up-to-date geographical inventory of the location of each rack within the data center floor plan and of the location of each electronic device within each rack, bay by bay.

Currently, however, it is burdensome to track such equipment changes in a data center along the X and Y axes (width and depth) at the rack level, but is even more burdensome to track equipment changes along the Z axis (height) at the bay level. Conventionally, the physical presence and location of electronic devices within a data center is determined manually. For example, during an inventory process, a network administrator typically walks from rack to rack around the data center and manually records the presence and location of network devices within each bay of each rack in the data center. Manual review and recordation of such information is time consuming, costly, and overly susceptible to human error.

SUMMARY OF THE INVENTION

According to an embodiment of the invention, there is provided a method of tracking electronic devices that are equipped with tracking tags. The method comprises the following steps: distributing reading devices in locations that correspond to locations designated for the electronic devices; recording the locations of the reading devices; activating the reading devices and thereby interrogating the tracking tags of the electronic devices that are present in the locations designated for the electronic devices; collecting identification data from the tracking tags; and determining a presence and/or a location of at least one of the electronic devices based on the collected identification data.

According to another embodiment of the invention, there is provided another method of tracking electronic devices that includes the following steps: tagging electronic devices with tracking tags; providing a rack having bays for receiving the electronic devices; distributing reading devices in locations that correspond to the bays; recording the locations of the reading devices; activating the reading devices and thereby interrogating the tracking tags of the electronic devices that are present in the bays; collecting identification data from the tracking tags; and determining at least one of the presence and location of said plurality of electronic devices based on the recording and collecting steps.

According to yet another embodiment of the invention, an apparatus is provided for tracking electronic devices having tracking tags associated therewith. A rack includes bays that receive the electronic devices. Reading devices are mounted to the rack and are distributed in correspondence with the bays. The reading devices are adapted to interrogate the tracking tags of the electronic devices to determine at least one of a presence and/or a location of at least one of the electronic devices.

According to still another embodiment of the invention, another apparatus is provided for tracking electronic devices that includes a means for tagging the electronic devices, a means for housing the electronic devices in designated locations, and a means for reading the means for tagging. The means for reading is mounted to the means for housing and is distributed in correspondence to the designated locations of the electronic devices. The apparatus also includes a means for activating the reading devices to interrogate the means for tagging. The apparatus further includes a means for collecting identification data from the tracking tags, and a means for determining the presence and/or location of the electronic devices based on the means for collecting.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

Figure 1:
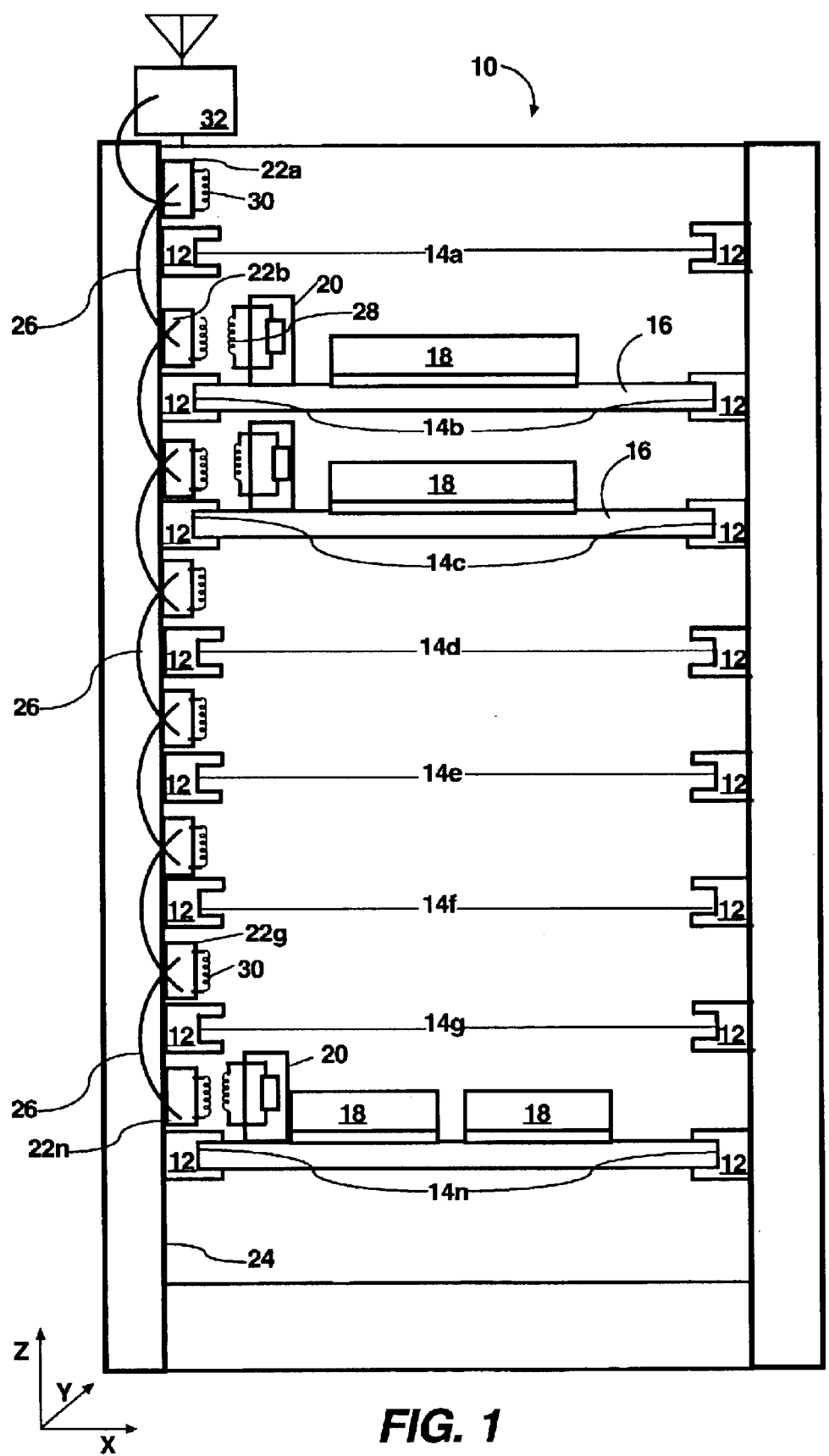
FIG. 1 illustrates a rack apparatus according to an embodiment of the present invention.
Figure 2:
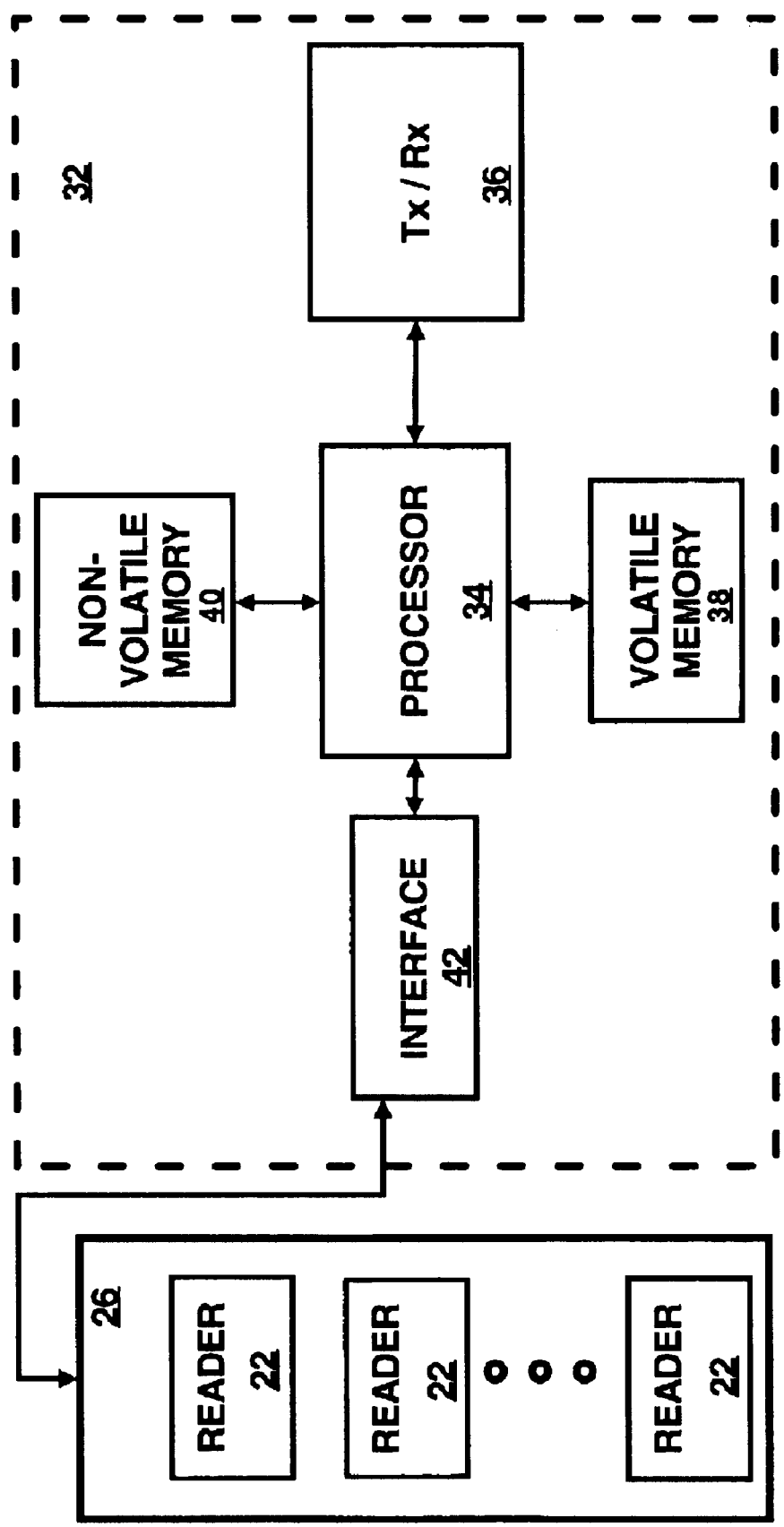
FIG. 2 illustrates a block diagram of a system used in accordance with the embodiment of FIG. 1.

In the following detailed description, numerous specific details are set forth in order to provide a thorough understanding of the present invention. However, it will be apparent to one of ordinary skill in the art that these specific details need not be used to practice the present invention. In other instances, well-known structures, interfaces, and processes have not been shown in detail in order not to unnecessarily obscure the present invention.

In accordance with the present invention, an automatic tracking system and method is provided for tracking the presence and/or location of any tagged electronic device within a data center. The purpose of automatically tracking electronic devices is to continuously monitor the location of each and every tagged electronic device down to the specific aisle, rack, and bay where the electronic device is mounted. Thus, it is possible with the present invention to eliminate the costly, time consuming, and error-prone method of manually tracking the presence and/or location of electronic devices within a data center.

In general, according to an embodiment of the present invention, a rack apparatus is provided in which identification technology "overlays" the rack apparatus wherein the identification technology is provided to track the presence and location of electronic devices located within the rack. The terminology "identification technology" means any system or apparatus for identifying objects such as bar code systems, magnetic stripe systems, radio frequency identification (RFID or RF identification) systems, and the like. Furthermore, the terminology "rack apparatus" is synonymous with data rack, server rack, electronics housing or enclosure, and the like. Thus, the present invention is not limited only to server rack applications implementing RF technology.

Generally, RF systems typically include readers and one or more tags that are attached to respective objects whose identity is thereby tracked. Readers are synonymous with interrogators, exciters, transceivers, transmitter/receivers, and the like. Tags are synonymous with transponders, and the like.

The tag is an electronic device that incorporates unique identification data, such as a number, and is generally attached to an object whose identity is desired to be tracked. Thus, the object's identity is identified by the interrogating reader which reads the number of the tag to which the object is attached. The RF system operates on radio frequency and, thus, RF systems do not require a direct line of sight between the reader and the tag. As such, the tag and tagged object may be located within an enclosure. RF tags are also known as RF transponders and may be "active" or "passive". Active tags are continuously powered by a battery, whereas passive tags briefly acquire power from the reader upon being interrogated thereby. Passive tags typically include a coil or antenna to collect the from the reader the RF signal from which the tag derives its temporary operating power. Accordingly, passive tags are located within close proximity to the reader (typically in the range from a few centimeters up to one meter) in order to ensure that the tags collect a sufficient amount of energy to operate. Passive tags typically include an integrated circuit for storing data an identification number. Passive tags are typically desirable due to their smaller size, fewer components, and reduced cost compared to active tags.

The reader typically includes an antenna, analog circuitry, digital processing circuitry, and a memory. The analog circuitry includes modulation circuitry for transmitting and receiving signals to and from the tag. The digital processing circuitry generates an interrogation signal which is modulated using the analog circuitry. Thus, the reader emits a radio frequency signal in the vicinity of the tag and the tag emits a response, from which the RF system determines the identity of the responding tag. More specifically, the reader transmits a coded RF signal, from which a nearby tag or tags collect energy. The nearby tag uses the collected energy to compare the coded RF signal to the tag's identification data. If the tag's identification data is the same as that encoded in the RF signal, then the tag relays its encoded identification data back to the reader. Alternatively, and as contemplated by the present invention, the RF system is configured to use the reader to interrogate the tag and then automatically relay the tag's identification data back through the RF system to the reader.

RF components and systems, in and of themselves, are generally well known to those of ordinary skill in the art. What is not currently known to those of ordinary skill in the art, however, is the present specific application and adaptation of RF technology for tracking electronic devices within a data center, which is further described below.

Referring now specifically to FIG. 1, an enclosure or rack 10 is shown which may be, for example, an Electronics Industry Association enclosure, 78 in. (2 meters) wide, 24 in. (0.61 meter) wide and 30 in. (0.76 meter) deep. The rack 10 includes opposed pairs of mounts 12 that define open bays 14a–n into which electronic devices 16 are located. The term "rack" includes any doors, lids, or other accessories associated with the rack (not shown). One of ordinary skill in the art will recognize that the mounts 12 and bays 14a–n merely exemplify one of any number of mounting means that are used with rack apparatus.

Furthermore, the term "bay" is synonymous with slot, opening, location, position, and the like.

The rack 10 may house any number of electronic devices 16 which may be modules, server boards, telecommunications devices, and the like, e.g., about forty (40) to eighty (80) devices. The electronic devices 16 typically include a number of components 18, e.g., processors, microcontrollers, high speed video cards, memories, semiconductor devices, and the like. Some racks include retractable rails to which the electronic devices are slidably mounted, wherein the retractable rails permit the electronic devices to be moved between a retracted position within the rack and an extended position in which the electronic devices are at least partially extended from the rack. In any case, it is highly desirable to track the presence, identification, and/or location of each electronic device 16 within each rack 10 in a data center.

Using any number of readily available identification technologies, each electronic device 16 is tagged with a tracking device or tag 20, such as a radio frequency (RF) transponder, or RF tag, as shown. Alternatively, the tag 20 may instead be a bar code tag, a magnetic tag, magneto-mechanical tag, microwave tag, and the like. In general, RF tags are typically programmed with unique identification codes that identify an object with which the RF tags are associated. In one embodiment, the tag 20 may be a passive device. In another embodiment, the tag 20 may be an active device having a relatively greater communication range.

As defined herein, the terminology "tracking device" or "tag" means hardware, information, signals, and the like that are not necessarily intrinsic to the circuitry or software associated with the electronic devices 16 or components 18 thereof. In other words, the tag is externally attached to a respective electronic device and is independent of the intrinsic workings of the electronic devices 16 and components 18. As shown, the tag 20 may be encoded with any unique identification, such as medium access controlled identification of the electronic device with which it is associated.

Before each electronic device 16 is installed in the rack 10, it is "tagged" with respective RF tags 20. As used herein, the word "attached" is broadly construed to include all types of associating an RF tag with an object to be tagged. The tags 20 are shown mounted onto a left front portion of each electronic device 16, but the tag 20 can be mounted to, printed on, or encapsulated within each electronic device 16.

The tag 20 may be attached to the respective electronic device by adhesive, by double-sided tape, by metal fasteners, and the like. Those skilled in the art will recognize that many other methods of physically associating tags 20 with respective electronic devices 16 are possible and the present invention is not limited to the examples set forth herein. In other words, it is not necessary to mount the tag 20 exactly as shown and it is contemplated that the tag 20 can be located anywhere on or in the electronic device 16, so long as the tag is within the recommended operating range of the manufacturer.

As shown in FIG. 1, located just above each pair of mounts 12 the rack 10 includes reading devices, coils, or readers 22a–n such as RF transponders, bar code scanners, magnetic pickups, and the like. Preferably, a strip of daisy-chained readers 22a–n are mounted along a planar face of the rack such as the front, as long as the readers 22a–n are located proximate the corresponding tags 20 within the operating range of such devices as mentioned above.

Thus, the readers 22a–n can be mounted in any alternative locations such as to an access door (not shown) of the rack, or to a front portion of a left inside wall 24 of the rack 10, and care is taken to ensure that the tags 20 are each attached at a uniform location on the face of each corresponding electronic device 16 so that each tag 20 aligns with a corresponding reader 22a–n. Accordingly, the tags 20 and readers 22a–n are distributed throughout each rack in a one-to-one respective arrangement such that each reader 22a–n is associated with a respective tag 20. As will be discussed below, this one-to-one tag to reader relationship enables one to determine the presence and location of a tag and its associated electronic device by virtue of knowing the location of the corresponding reader. Moreover, it is contemplated that one or more electronic devices 16 could occupy more than one bay location. For purposes of example only, in one embodiment an electronic device 16 occupies bay locations 14d–g. In one embodiment, readers 14d–g are associated with the electronic device 16. In another embodiment, a single reader 14g (or 14f, or 14c, or 14d) is associated with the electronic device 16 occupying bay locations 14d–g. Accordingly, it is also contemplated that multiple readers 22a–n could track the location of a single electronic device that occupies more than one bay location, or that one of the readers 22a–n could track the location of such a larger electronic device.

The location of each reader is predetermined so that the presence and location of each corresponding tag may be easily identified. Each coil or reader 22a–n is of the same known size and, therefore, given any coil identity k (from 1 at the top to n at the bottom, down along the Z-axis), one can quickly identify the exact position of any given coil in inches, mm, etc.

Also, the identity and location of each reader 22a–n may initially be manually associated with its respective bay and rack location and entered into RF system computer memory. For example, reader 22a can be manually associated with bay 14a, reader 22b with bay 14b, and so on. Then, to identify the location of any given RF tag 20 (and therefore each associated electronic device 16), the daisy-chained readers 22a–n are energized sequentially, or in any desired predetermined pattern. Thus, knowing an energized coil number or identity, ergo the bay location and the RF response (if any), the location and presence of electronic devices in a rack can be accurately determined. Thereafter, whenever an electronic device 16 is removed, or moved from one bay or rack location to another, the RF system can track such movement by virtue of the known location of the readers 22a–n.

One of ordinary skill in the art will recognize that the readers 22a–n may be mounted to the rack 10 in any reasonable manner including any of a variety of fastening devices including tie straps, hook and loop material, screws, mounting brackets, and the like (not shown). The readers 22a–n and tags 20 may be mounted in any corresponding locations, positions, or orientations on the rack to ensure that each tag 20, no matter where located in or on the electronic device 16, aligns with a corresponding reader 22a–n when a electronic device 16 is docked to the rack 10. Accordingly, the readers 22a–n may alternatively be mounted to a rear portion of the inside wall 24 of the rack 10, to a door (not shown) of the rack, on the mounts 12, and the like. As shown, the readers 22a–n are daisy-chained together in series. For example, the output of one reader 22a–n is connected to an input of another reader 22a–n via a connector 26. Alternatively, the readers 22a–n may be connected by a connector, in parallel, such that each reader 22a–n can be addressed independently, or may be connected in any other reasonable manner. The location of each reader 22a–n may be designated by its corresponding rack 10 and bay 14.

FIG. 1 further illustrates the readers 22a–n and the tags 20 according to an RF identification technology embodiment of the present invention. RFID systems are generally known to those of ordinary skill in the art and are readily available from various manufacturers including Texas Instruments of Piano, Tex. and Alien Technologies of Morgan Hill, Calif. Also contemplated within the scope of the present invention are various other systems that use tags and readers to identify objects from a distance by associating the tag with the object, such as bar code systems.

Referring still to FIG. 1, the tags 20 store unique identification codes that identify the electronic devices 16 with which the tags 20 are associated and that can be read by the readers 22a–n. The tags 20 may store the unique identification codes in addressable memory and may store attributes of the corresponding electronic device 16. Each of the tags 20 includes a transceiver or an antenna 28. When the tags 20 are within the proximate operating range of the readers 22a–n and when the readers 22a–n are activated, the antennas 28 (e.g. coils, or the like) receive an interrogating signal from the readers 22a–n from which the tags convert to operating power. As used herein, the term "proximate" means located within a distance wherein the tags 20 and readers 22a–n are operable with one another. Typical passive RF systems have a reader to tag operating range of about 18 inches. In practice, this range will vary depending on the output power of the readers, the geometries of the reader and tag coils, the signal frequency, and other operating parameters. In response to receiving the interrogation signal, the tags 20 transmit a reply such as its identification code.

The readers 22a–n then receive the reply from the tags 20 via antenna 30. In other words, each of the readers 22a–n interrogates a corresponding one of the tags 20 to receive the identification code therefrom. Upon being energized by the reader 22a–n, the tag 20 steps through a preprogrammed sequence of events that addresses memory locations therein and that transmits its stored data (e.g. ID code) from the memory locations back to the reader 22an.

According to an embodiment, when the reader 22a–n receives data, such as the identification codes and attribute information from the electronic devices, back from the tag 20, it decodes that data and transmits the data to a computer or tracking node 32 mounted atop the rack 10.

Figure 3:
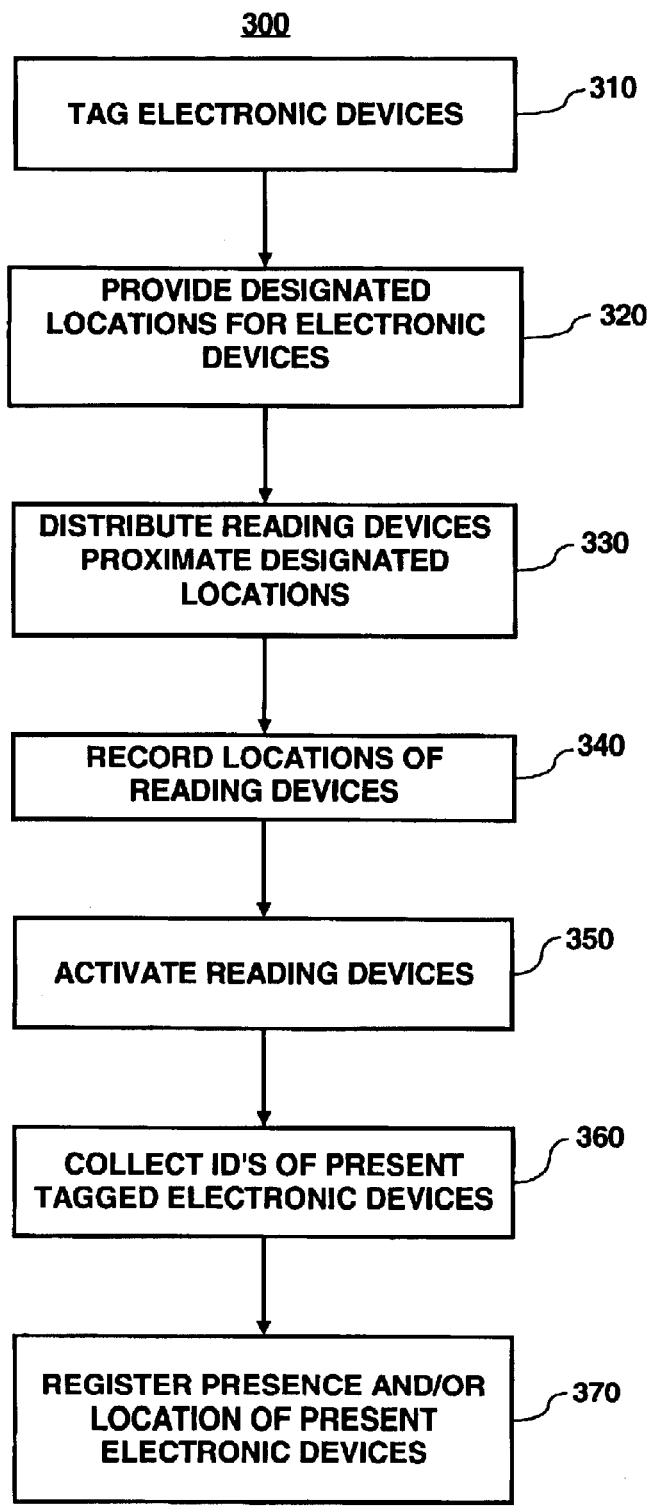
FIG. 3 illustrates a flow diagram of a method of tracking electronic devices according to another embodiment of the present invention.

Referring now to FIG. 3, the tracking node 32 includes a processor 34 and a transceiver 36 for communicating with other tracking nodes (not shown) and a host computer (not shown) elsewhere within the data center. The tracking node 32 further includes volatile and non-volatile memory 38 and 40 respectively. Executable code for controlling activation of the readers 22a–n may be stored in the non-volatile memory 40. The tracking node 32 includes an interface 42 for communicating with the readers 22a–n.

Referring again to FIG. 1, the tracking node 32 may be programmed to sequentially activate the readers 22a–n from top to bottom, vice-versa, or in any desired pattern since the location of each reader is recorded. It is also contemplated that the tracking node 32 could simultaneously activate the readers 22a–n if desired. The tracking node 32 may query the status of any given bay 14 by activating the readers 22a–n to detect the presence or absence of tags 20 and their corresponding electronic devices 16. The location of each reader 22a–n is stored in the memory of the tracking node 32, such as in the non-volatile memory 42 or a separate storage device (not shown). Thus, the node 34 can correlate the predesignated or known location of each reader 22a–n to a corresponding tag 20 and associated electronic device 16. Accordingly, the tracking node 32 can detect not only the presence of any given electronic device 16 within a bay 14, but can also determine the location of a particular electronic device 16 by its identification code.

FIG. 3 illustrates a method 100 for determining the presence and location of electronic devices within a rack, according to an embodiment of the invention. Steps 310–340 involve the initial setup of electronic devices within racks in a data center. In step 310, the electronic devices are tagged, such as with an RF tag as described above. In step 320, designated locations are provided for receiving each of the electronic devices, such as bays within a server rack as discussed above. In step 330, reading devices such a RF readers are correspondingly placed in locations proximate the designated locations for the electronic devices, such as on an inside wall of a server rack. In step 340, the locations of the reading devices are recorded in computer memory.

Steps 350–370 involve operation of the RF system according to an embodiment of the present invention. In step 350, the reading devices are activated by the RF system to interrogate or read the tagged electronic devices. The reading devices may be activated sequentially, such as starting from a home position at the top of the rack and ending at a distal position at a bottom of the rack and vice versa. In step 360, the identification of each present tagged electronic device is collected. The collection of the identification of each present tagged electronic device may also be performed sequentially. In step 370, based on the recording the locations of the reading devices and based on collecting the identification of each present tagged electronic device, the identification of each present tagged electronic device is associated with the location of its corresponding reader and bay so as to determine the presence and location of present electronic devices. The method 300 is an exemplary embodiment, and it will be apparent to one of ordinary skill in the art that the method is subject to many alternatives, modifications and variations without departing from the spirit and scope of the invention.

According to the above described embodiments, the present invention is capable of tracking the presence, identity, and/or location of electronic devices within racks in a data center. As described above, each bay of each rack is initially associated with a reader such that the RF system retains the reader location in memory. Electronic devices are installed in the bays of the racks whereupon the readers read the tags associated with such electronic devices and the RF system associates the read tag data with the known reader location to, in turn, provide location information for each tagged electronic device. The RF system continuously or intermittently monitors or activates the readers so that any change in location of an electronic device is automatically tracked. Thus, the present invention eliminates the need for manual tracking or inventory of electronic devices.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method of tracking electronic devices equipped with tracking tags, the electronic devices being housed in bays in a server rack where the bays are provided along a vertical axis of the server rack, said method comprising:

distributing a plurality of reading devices in locations on said server rack corresponding to said bays in said server rack, wherein said server rack is operable to be used in a data center to house said electronic devices;

recording the locations of said plurality of reading devices;

activating said plurality of reading devices and thereby interrogating said tracking tags of said electronic devices present in said bays, wherein said electronic devices are provided in said bays arranged along said vertical axis of said server rack and said tracking tags include radio frequency tracking tags;

collecting identification data from said tracking tags; and determining at least one of a presence and a location of at least one of said electronic devices based on the collected identification data.

2. The method as claimed in claim 1, wherein said distributing step further comprises placing said plurality of reading devices to respectively align with said tracking tags when said electronic devices are docked within said bays of said enclosure.

3. The method as claimed in claim 1, wherein said electronic devices include a plurality of types of electronic devices and said method further comprises attaching said tags at approximately the same locations on said electronic devices.

4. The method as claimed in claim 1, wherein said recording step comprises storing the locations of said plurality of reading devices in a computer memory.

5. The method as claimed in claim 1, wherein said activating step is performed sequentially by said plurality of reading devices comprising at least one of a plurality of radio frequency readers, a plurality of bar code scanners, and a plurality of inductive devices.

6. The method as claimed in claim 1, wherein said collecting step is performed sequentially on said tracking tags which comprise at least one of radio frequency tags, bar code tags, or magnet tags.

7. The method as claimed in claim 6, wherein said determining step comprises converting said response signal into said identification data and storing said identification data in a computer memory.

8. A method of tracking a plurality of electronic devices, the electronic devices being housed in a plurality of bays in a server rack where the bays are provided along a vertical axis of the server rack, said method comprising:

tagging said plurality of electronic devices with a plurality of tracking tags, said plurality of tracking tags including radio frequency tracking tags;

providing said server rack having said plurality of bays for receiving said plurality of electronic devices, wherein said server rack is operable to be used in a data center to house said plurality of electronic devices;

distributing a plurality of reading devices in locations corresponding to said plurality of bays;

recording the locations of said plurality of reading devices;

activating said plurality of reading devices and thereby interrogating said plurality of tracking tags of said plurality of electronic devices present in said plurality of bays, wherein said plurality of electronic devices are provided in said bays arranged along said vertical axis of said server rack;

collecting identification data from said plurality of tracking tags; and determining at least one of the presence and location of said plurality of electronic devices based on said recording and collecting steps.

9. The method as claimed in claim 8, wherein said tagging step comprises associating at least one of a plurality of radio-frequency tags, a plurality of bar code tags, and a plurality of magnetic tags with said plurality of electronic devices.

10. The method as claimed in claim 8, wherein said distributing step comprises placing at least one of a plurality of radio frequency readers, a plurality of bar code scanners, and a plurality of magnetic pickups.

11. The method as claimed in claim 10, wherein said distributing step further comprises placing said plurality of reading devices to respectively align with said plurality of tracking tags when said electronic devices are docked within said bays of said enclosure.

12. The method as claimed in claim 8, wherein said plurality of electronic devices include a plurality of types of electronic devices and said method further comprises attaching said plurality of tracking tags at approximately the same locations on said plurality of electronic devices.

13. The method as claimed in claim 8, wherein said recording step comprises storing the locations of said plurality of reading devices in a computer memory.

14. The method as claimed in claim 8, wherein said activating step comprises sequentially activating said plurality of reading devices which comprise at least one of a plurality of radio frequency readers, a plurality of bar code scanners, and a plurality of magnetic pickups.

15. The method as claimed in claim 8, wherein said collecting step comprises receiving a response signal from at least one of a radio frequency tag, a bar code tag, and a magnetic tag.

16. The method as claimed in claim 15, wherein said determining step comprises converting said response signal into said identification data and storing said identification data in a computer memory.

17. An apparatus for tracking a plurality of electronic devices having a plurality of tracking tags associated therewith, said apparatus comprising:

a server rack having a plurality of bays, said plurality of bays receive said plurality of electronic devices such that said plurality of electronic devices are arranged along a vertical axis of said server rack and said server rack is operable to be used in a data center to house said plurality of electronic devices; and a plurality of reading devices mounted to said server rack and distributed in correspondence with said plurality of bays, said plurality of reading devices being adapted to interrogate said plurality of tracking tags of said plurality of electronic devices to determine at least one of a presence and a location of at least one of said plurality of electronic devices, said plurality of tracking tags including radio frequency tracking tags.

18. The apparatus as claimed in claim 17, wherein said plurality of reading devices are located such that they respectively align with said plurality of tracking tags when said plurality of electronic devices are docked within said plurality of bays of said server rack.

19. The method as claimed in claim 17, wherein said plurality of electronic devices include a plurality of types of electronic devices and said plurality of tracking tags are attached at approximately the same locations on said plurality of electronic devices.

20. The apparatus as claimed in claim 17, wherein said plurality of electronic devices is a plurality of servers and said plurality of tracking tags are a plurality of radio frequency tags attached to said plurality of electronic devices.

21. The apparatus as claimed in claim 20, wherein said plurality of reading devices are a plurality of daisy-chained radio frequency readers being mounted to an inside wall of said rack.

22. An apparatus for tracking electronic devices, said apparatus comprising:

radio frequency tagging means for tracking said electronic devices;

means for housing said electronic devices in bays, wherein the bays are provided along a vertical axis and said means for housing is operable to house said electronic devices in a data center;

means for reading said radio frequency tagging means, said means for reading being mounted to said means for housing and being distributed in correspondence to said bays;

means for activating said means for reading to interrogate said radio frequency tagging means;

means for collecting identification data from said radio frequency tagging means; and means for determining at least one of the presence and location of said electronic devices.

23. The apparatus of claim 22, wherein the electronic devices include a plurality of types of electronic devices and said radio frequency tagging means are attached at approximately the same locations on said electronic devices.

* * * * *